(12) United States Patent
Vasseur et al.

(10) Patent No.: US 8,644,445 B2
(45) Date of Patent: Feb. 4, 2014

(54) SPRING MOUNTING DEVICE FOR NUCLEAR FUEL ROD

(75) Inventors: Patrick Vasseur, Point Saint Esprit (FR); Jean-Luc Allard, Mejannes le Clap (FR); Serge Fantini, Saint Genies de Comolas (FR)

(73) Assignee: Areva NC, Paris (FR)

( * ) Notice: Subject to any disclaimer, the term of this patent is extended or adjusted under 35 U.S.C. 154(b) by 1555 days.

(21) Appl. No.: 12/278,132

(22) PCT Filed: Feb. 1, 2007

(86) PCT No.: PCT/EP2007/050982
§ 371 (c)(1),
(2), (4) Date: Aug. 1, 2008

(87) PCT Pub. No.: WO2007/088185
PCT Pub. Date: Aug. 9, 2007

(65) Prior Publication Data
US 2009/0041176 A1    Feb. 12, 2009

(30) Foreign Application Priority Data
Feb. 2, 2006   (FR) ..................................... 06 50375

(51) Int. Cl.
*G21C 3/34*   (2006.01)
*G21C 7/00*   (2006.01)
*G21C 19/00*  (2006.01)
*G21C 9/00*   (2006.01)

(52) U.S. Cl.
USPC ............ 376/441; 376/267; 376/299; 376/242

(58) Field of Classification Search
USPC ......................................................... 376/441
See application file for complete search history.

(56) References Cited

U.S. PATENT DOCUMENTS 5,375,756 A   12/1994   Haughton et al.

FOREIGN PATENT DOCUMENTS

| EP | 0628967 A1 | 12/1994 |
| JP | 03015799 | 1/1991 |
| JP | 03015799 A * | 1/1991 |
| JP | 11038179 | 2/1999 |

OTHER PUBLICATIONS

Ito et al., JP 03015799 Human Translation, Jan. 24, 1991, pp. 1-17.*
International Search Report for International Patent Application No. PCT/EP2007/050982 (Apr. 17, 2007).

* cited by examiner

*Primary Examiner* — Jack W Keith
*Assistant Examiner* — Frank J McGue
(74) *Attorney, Agent, or Firm* — Nixon Peabody LLP

(57) ABSTRACT

A spring mounting device in a cladding tube for nuclear fuel, comprising a spring distributor, a spring loader in the cladding tube, the distributor supplying the springs to the loader, said loader comprising a longitudinal slide to receive the spring, a pusher in order to set the spring into place in the cladding tube and is able to move in the slide, means of displacement of said pusher, said device comprising mechanical means in order to associate the actuation of the means of displacement with that of the spring distributor.

10 Claims, 7 Drawing Sheets

SPRING MOUNTING DEVICE FOR NUCLEAR FUEL ROD

CROSS REFERENCE TO RELATED APPLICATIONS OR PRIORITY CLAIM

This application is a national phase of International Application No. PCT/EP2007/050982, entitled "SPRING FITTING DEVICE FOR A NUCLEAR FUEL ROD", which was filed on Feb. 1, 2007, and which claims priority of French Patent Application No. 06 50375, filed Feb. 2, 2006.

DESCRIPTION

Technical Field and Prior Art

This invention relates to a spring mounting device in a cladding tube in order to realise nuclear fuel rods.

A nuclear fuel rod comprises a cladding tube provided with an end of a first plug, a spring, nuclear fuel pellets, for example MOX (mixture of plutonium oxide and uranium oxide), and a second plug to seal the cladding tube.

The spring makes it possible to reserve a determined volume in the cladding tube in order to take into account the expansion of the gases contained in the rod during the heating of the pellets, and ensure the maintaining in position of the pellets during transport of the rod.

This spring can be mounted in the cladding tube before or after the pellets are set into position.

This spring can be mounted manually, however it is preferable to limit in the process of rod manufacture, manual manipulations in order to reduce manufacturing time.

Furthermore, it is important to verify the effective setting into place of a spring, as the absence of a spring causes the rod to be discarded.

It is consequently a purpose of this invention to provide an automated device for mounting springs in cladding tubes.

It is also a purpose of this invention to provide a spring mounting device in cladding tubes providing safe mounting.

DESCRIPTION OF THE INVENTION

The aforementioned purposes are reached by a mounting device comprising a spring distributor associated with a spring loader in a cladding tube, the activation of the spring loader causing the supply of a spring to the loader.

In other terms, a mechanical control connects the loader to the spring distributor, it is then not necessary to provide electrical or electronic means of synchronisation between the loader and the distributor. The mounting device is thus made simpler and more robust.

Consequently, the subject-matter of the invention is mainly a spring mounting device in a cladding tube for nuclear fuel, comprising a spring distributor, a spring loader in the cladding tube, the distributor supplying the springs to the loader, said loader comprising a longitudinal slide to receive the spring, said slide comprising an outlet end whereby the spring is sent in the cladding tube, a pusher able to move in the slide in order to place the spring in position in the cladding tube, and means of displacement of said pusher, said device also comprising also mechanical means to associate the actuation of the means of displacement with that of the spring distributor.

The distributor can comprise a longitudinal axis cylinder barrel pivotable around its axis, said cylinder barrel comprising longitudinal grooves on its outer peripheral surface each able to receive a spring, a jacket surrounding the cylinder barrel, provided with a longitudinal slot able to allow a spring to pass, said cylinder barrel and said jacket being able to turn one in relation to the other around the longitudinal axis in order to align the slot with a groove, the jacket being able to take a filling position of the cylinder barrel and a distribution position, said slot being arranged to the right of the slide of the loader in distribution position, the actuating of the means of displacement causing via the intermediary of the mechanical means the rotation of the cylinder barrel in relation to the jacket and the alignment of the slot with a groove loaded with a spring.

Advantageously, the mechanical means comprise a non-return means, of the ratchet wheel type, interposed between the cylinder barrel and the means of displacement.

The mechanical means can comprise a link arm attached to a pawl of the ratchet wheel, with a sprocket wheel of the ratchet wheel being integral in rotation with the cylinder barrel, a first end of a lever arm being connected to a second end of the link arm by a pivot connection, the lever arm being mounted pivotable on a post around an axis of rotation, said post supporting a second end of the cylinder barrel, a second end of lever arm opposite the first end in relation to the axis of rotation being able to come into contact with a mobile element integral with the means of displacement in order to pivot the lever arm around the axis of rotation.

The mobile element can comprise a ramp, wherein along the second end of the lever arm is able to slide.

In an example embodiment, the lever arm comprises a roller mounted on the second end of the lever arm, said roller being pivotable around an axis that is parallel to the axis of rotation.

The distributor comprises advantageously means to lock the jacket either in the filling position, or in the distribution position.

The means of locking can comprise a pin screwed in a post supporting the first longitudinal ends of the cylinder barrel and of the jacket and cooperating with the jacket in the filling position and in the distribution position.

Furthermore, the means of displacement can comprise a belt extending longitudinally under the slide, the pusher being integral in movement with said belt.

The loader can comprise a guide element with an open end of the cladding tube in order to align said end with an outlet end of the slide.

The loader comprises advantageously means to cause at the end of mounting of the spring a coming together of the guide element and of the pusher, said pusher moving in the direction of the outlet end of the cladding tube.

A subject-matter of the invention is also a method of mounting a spring in a cladding tube implementing a spring mounting device comprising a spring loader and a spring distributor for said loader, comprising the steps:

of actuating the loader,
of actuating the distributor by the loader,
of supplying a spring to said loader,
of loading the spring in the cladding tube.

Said method can furthermore comprise a step of setting into place of the cladding tube in alignment with the spring.

BRIEF DESCRIPTION OF THE DRAWINGS

This invention shall be better understood using the description which shall follow and the annexed drawings, wherein the front and the rear corresponding respectively to the left and to the right of the drawings and wherein.

DETAILED DESCRIPTION OF PARTICULAR EMBODIMENTS

Figure 1:
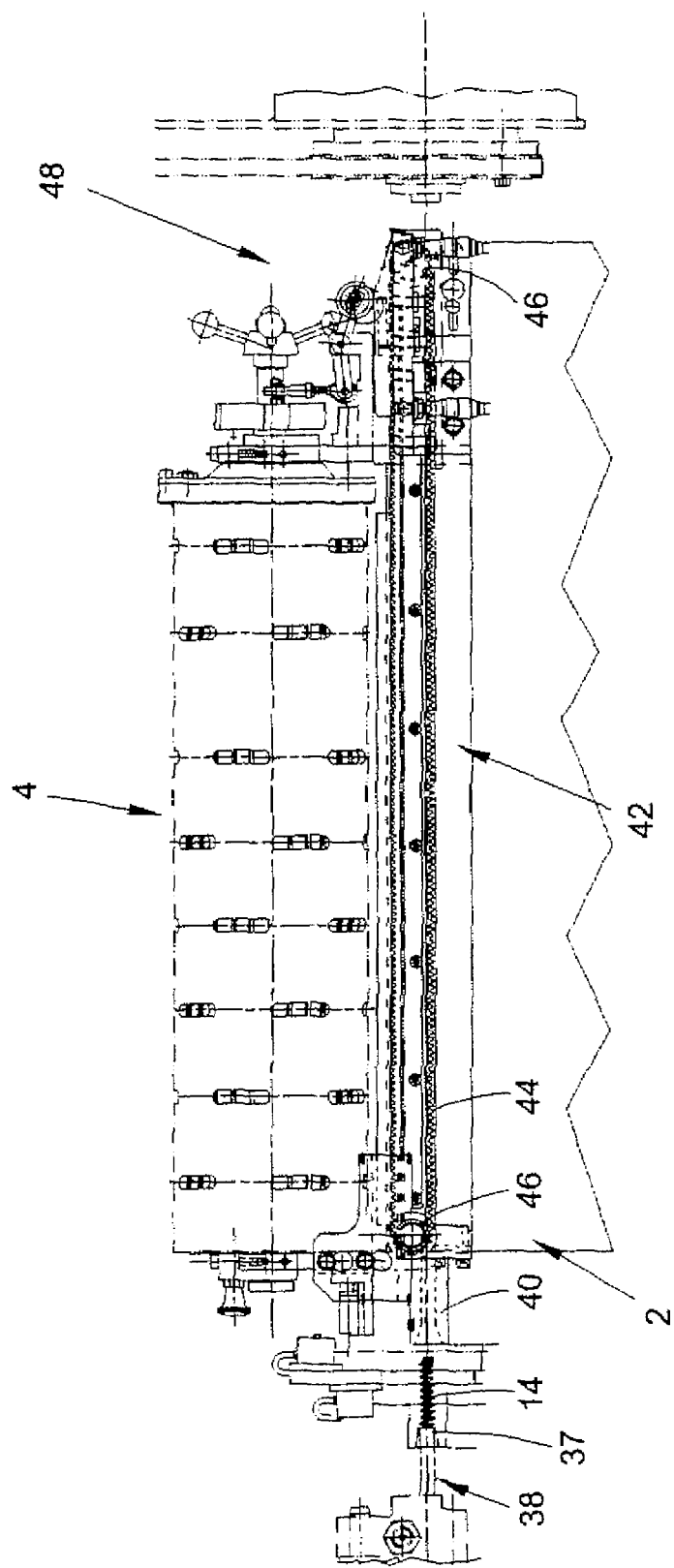
FIG. 1 is a side view of a lower portion forming a spring loader of a spring mounting device according to this invention.
Figure 4:
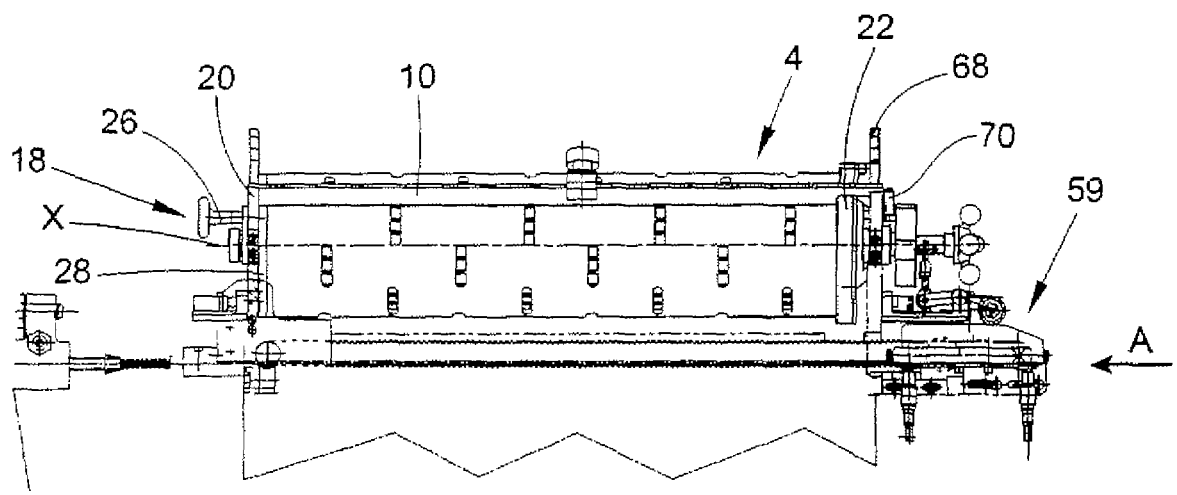
FIG. 4 is a side view of the upper portion forming a spring distributor of the mounting device according to this invention.

In FIG. 1, an embodiment can be seen of a spring mounting device according to this invention comprising a spring loader 2 as a solid line, forming the lower portion of the device and a spring distributor 4 to the loader 2 as a dotted line, forming the upper portion of the device. The distributor 4 is shown as a solid line in FIG. 4.

The device according to this invention is intended to mount springs in cladding tubes before or after the setting in place of nuclear fuel pellets, notably MOX in order to form nuclear fuel rods.

The cladding tubes used are of cylindrical form of great length relatively to their diameter, one end being capped in order to allow for the loading of a spring, then a column of pellets, or a column of pellets, then a spring.

The spring is a spring of the coiled spring type and is intended to reserve a determined volume for the dilation of the gases enclosed in the rod during their heating and to maintain the pellets substantially immobile.

The distributor 4 according to this invention comprises a cylinder barrel 8 (FIG. 7B) of X axis, pivotable around its X axis and a jacket 10 surrounding said cylinder barrel 8; the jacket 10 pivots relatively to the cylinder barrel 8.

The cylinder barrel comprises on its outer peripheral surface longitudinal grooves 12 to receive a spring 14, the grooves 12 are advantageously regularly distributed.

The jacket 10 comprises a slot 16 able to allow a spring 14 to pass; as such when the slot is aligned with a groove 12 loaded with a spring 14, the latter can pass through slot 16.

Figure 7A:
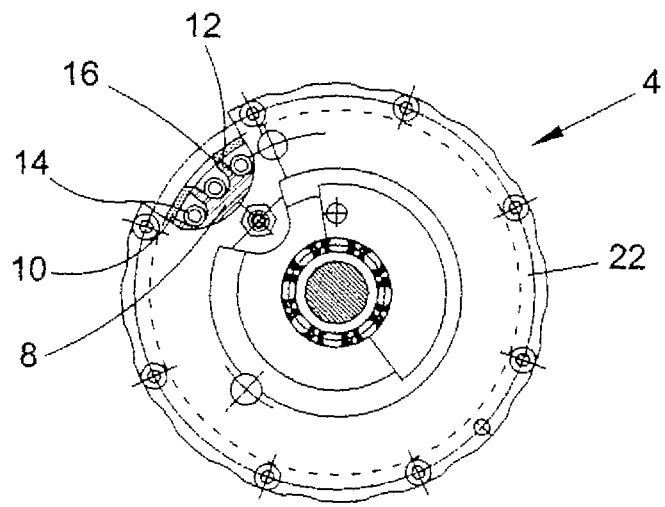
Figure 7B:
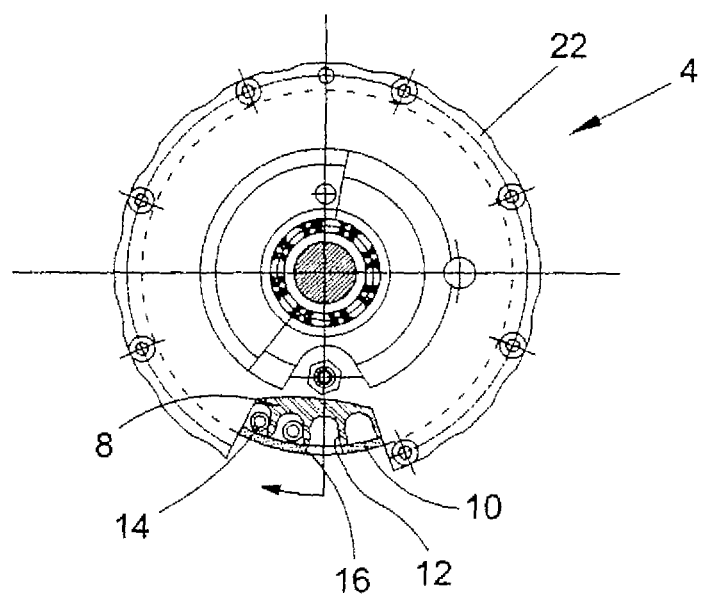

The jacket can have a filling position I shown in FIG. 7A and a distribution position II of the cylinder barrel shown in FIG. 7B. The distributor then comprises means 18 for immobilising the jacket 10 in one or the other of the filling I and distribution II positions.

The distributor comprises first and second lateral posts 20, 22 mounted on either side of the jacket 10 and of the cylinder barrel 8 to support them in rotation.

The means 18 of locking of the jacket are formed of a pin 26 mobile axially in the post 20 and able to cooperate with the jacket 10 in the filling position I and in the distribution position II.

In the filling position I, one end (non visible) of the pin 26 penetrates into a first orifice (non visible) arranged in a first longitudinal end 28 of the jacket 10, and in the distribution position II into a second orifice (non visible) of the jacket 10.

In the example shown, the pin 26 is formed by a threaded end of pin, which is screwed in the post 20; the passage from the position I to the position II is accomplished by unscrewing and screwing of the pin 26. A pin 26 could be provided brought elastically in the direction of the jacket 10, the change in position of the jacket 10 would be accomplished by traction on the pin 26 to withdraw the end of the pin 26 from one of the orifices of the jacket 10.

The distributor can comprise means to verify the presence of a spring 14 in a groove 12, for example optical means of the laser type.

It is preferred however to directly verify the presence of the spring in the cladding tube using a sensor, for example of the optical type.

The distributor 4 distributes the springs to the loader 2. In particular, a spring housed in a groove 12 falls through the slot 16 in a slide 32 of the loader 2, the slide 32 being of an X1 axis parallel to the X axis (FIG. 2).

The loader 2 is arranged below the distributor 4, as such the springs are distributed by gravity in the slide 32.

The loader 2 also comprises a pusher 34 mobile longitudinally along the X1 axis in order to exert a push force on a first end 14.1 of the spring 14 or rear end.

The slide 32 comprises an outlet end 36 whereby the spring 14 exits. The cladding tube 38, and notably its open end 37 are advantageously maintained by a guide element 40, in order to align the open end 37 of the cladding tube 38 with the outlet end 36 of the slide 32.

The cladding tube 38 can be maintained in position by a clamp 41 arranged at the front end of the loader 2.

The loader comprises means 42 to displace the pusher along the X1 axis. In FIG. 1, the means 42 are formed, for example by a belt 44 provided with teeth, said teeth driving two sprocket wheels 46 pivoting between one rear end of the slide and its front end. As such, the pusher 34 can move along the entire length of the slide. Other means of displacement can be suitable, for example a device provided with a worm screw can also be considered.

According to this invention, the distributor is controlled by the means of displacement 42 of the pusher 34, As such, at each actuation of the loader 2, the latter controls the distributor 4 to provide it with a spring 14.

For this, the device according to this invention comprises mechanical means 48 intended to associate the displacement of the belt 44 with the rotation of the cylinder barrel 8.

The mechanical means 48 comprises a link arm 50 mounted by a first end 52 on an interface 72 integral in rotation unidirectionally with a rear lateral face 53 of the cylinder barrel 8. As such, the displacement of the end 52 causes the displacement of the cylinder barrel 8 only in a rotational direction F. In another sense of rotation, the end 52 and the cylinder barrel 8 have independent movements.

The interface 72 is for example formed by a ratchet wheel, a wheel (not shown) provided on its periphery with inclined teeth being mounted integral in rotation with the cylinder barrel 8 in parallel to the rear face 53 of the cylinder barrel and a pawl (not shown) able to drive the wheel in a sense of rotation being integral with the end 52.

Any other device allowing for the unidirectional drive in rotation of the cylinder barrel around the X axis can be considered.

The second post 22 has a ring form, the rear face 53 of the cylinder barrel is then accessible by a central open portion of the second post 22.

The end 52 of the arm 50 is mounted in free rotation around a rod 54 integral with the pawl; as such the arm 50 can have an angular movement in relation to the pawl.

An effort upwards or downwards applied to the rod 54 causes a displacement of the pawl around the X axis, which by driving a tooth of the wheel, causes a rotation of the cylinder barrel 8 around the X axis in the direction F.

During the return to at-rest position of the rod 54, the pawl pivots around the X axis in a direction opposite direction F, it slides then on the tooth, and is then in a position to once again drive the ratchet wheel. As such at each rotation of the cylinder barrel 8, a groove 12 provided with a spring 14 is placed across from the slot 16 of the jacket 10.

The link arm 50 is connected by a second end 58 to a first end 57 of a lever arm 56, pivoting around the post 22 substantially on its median portion, around a Z axis. The link arm 50 and the lever arm 58 pivot in relation to one another.

The lever arm is, in the example shown, elbow-shaped, with the elbow being arranged on the axis of rotation of the lever.

The lever arm is able to be placed into rotation around the Z axis, by a mobile element 59 with the belt 44 of the loader.

In the example shown, the mobile element comprises a slope 60 able to cooperate with a second end 62 of the lever arm 56.

It can be provided to realise the pusher 34 and the mobile element 59 from a single part.

Figure 6:
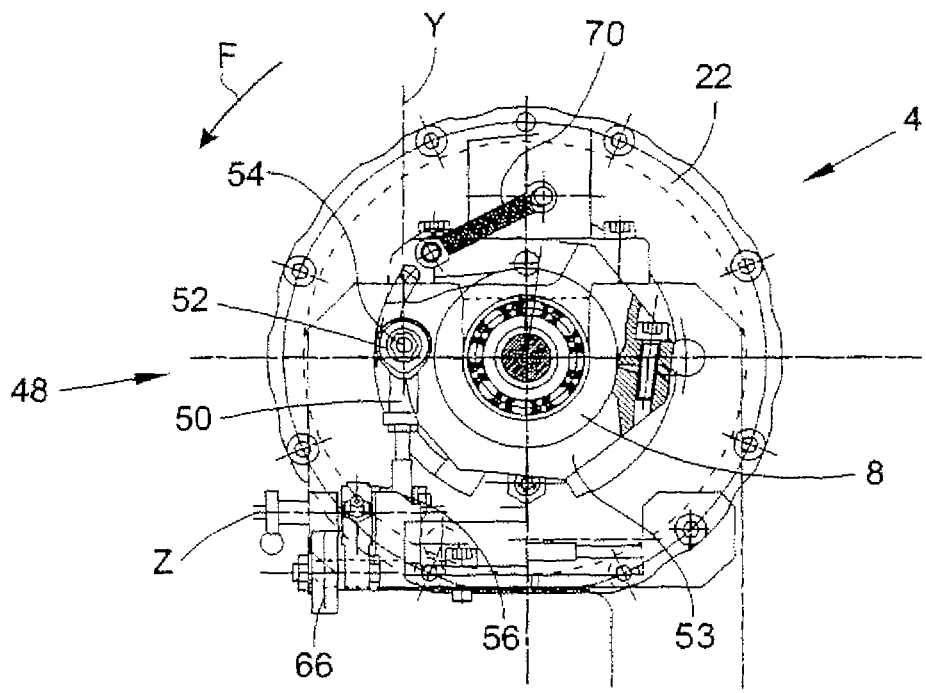
FIG. 6 is a view according to the arrow A of FIG. 4, FIGS. 7A and 7B are cross-section views according to the cutting plane E-E of FIG. 5B in a filling position and in a distribution position respectively.

As such, when the second end 62 meets the slope 60, the position of the lever arm 56 is modified, the latter turns around the Z axis and drives with it the link arm 50, which then has a movement that is substantially according to a Y axis, orthogonal to the X and Z axes. The movement according to Y of the arm 50 causes the rotation of the cylinder barrel 8 in the direction of the arrow F (FIG. 6)

The slope 60 is inclined towards the rear. The mobile element 59 also comprises a portion 64 that is substantially parallel to the plane of the belt, arranged before the slope 60. As such, when the mobile element 59 goes back, the second end 62 of the lever arm 56 first meets the slope 60, then the portion 64.

The portion 64 provides the maintaining of the lever arm in release position of a spring, i.e. the maintaining of a groove of the cylinder barrel 8 to the right of the slide 32, by preventing any other movement of the cylinder barrel 8.

The slope 60 is not necessarily flat, the latter may be concave, convex, or in steps. A mobile element 59 may also be considered in the form of an eccentric placed into rotation by the displacement of the belt 44.

Advantageously, the second end 62 of the lever arm 56 is provided with a roller 66 mounted in free rotation on the lever arm 56 in order to reduce the friction of the lever arm 56 on the mobile element 62.

An elastic means 70 connects the post 22 to the interface 72, in the example the elastic means brings back the pawl to at-rest position.

We shall now explain the operation of the spring mounting device according to this invention.

Figure 5A:
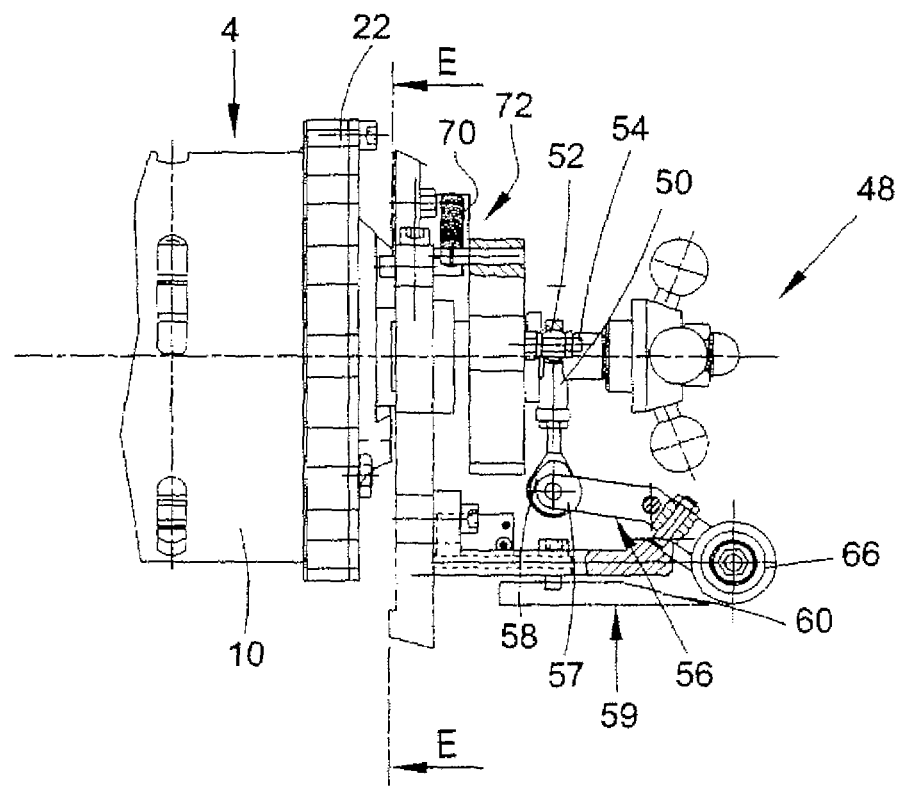
FIGS. 5A and 5B are detailed views of FIG. 4 in two positions of operation.
Figure 5B:
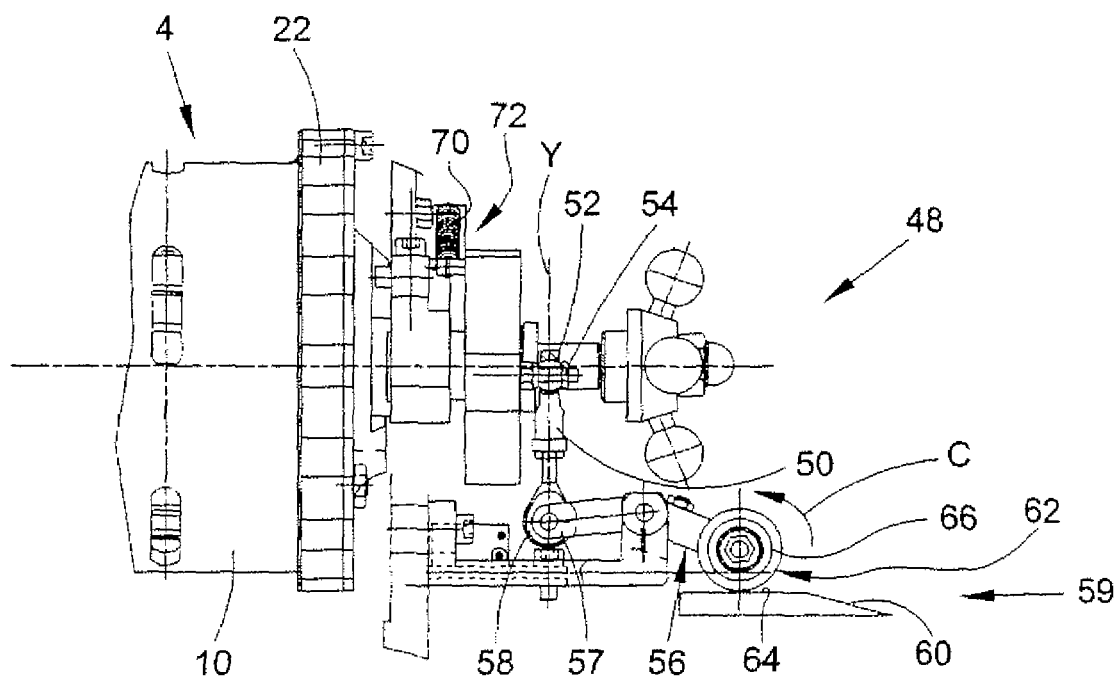

The loader 2 is actuated, the belt 44 moves in the direction B towards the rear (FIG. 2A) driving the mobile element 59. The slope 60 then meets the roller 66, causing the tipping of the lever arm 56 around the Z axis according to the arrow C (FIG. 5B). The link arm 50 then has a movement according to the Y axis downwards, exerting a traction effort downwards on the rod 54 and the pawl, which causes a rotation of the cylinder barrel 8 around the X axis via the intermediary of the interface 72 such as described hereinabove. A groove 12 loaded with a spring is then placed across from the slot 16.

A spring falls in the slide 32 of the loader.

Figure 2A:
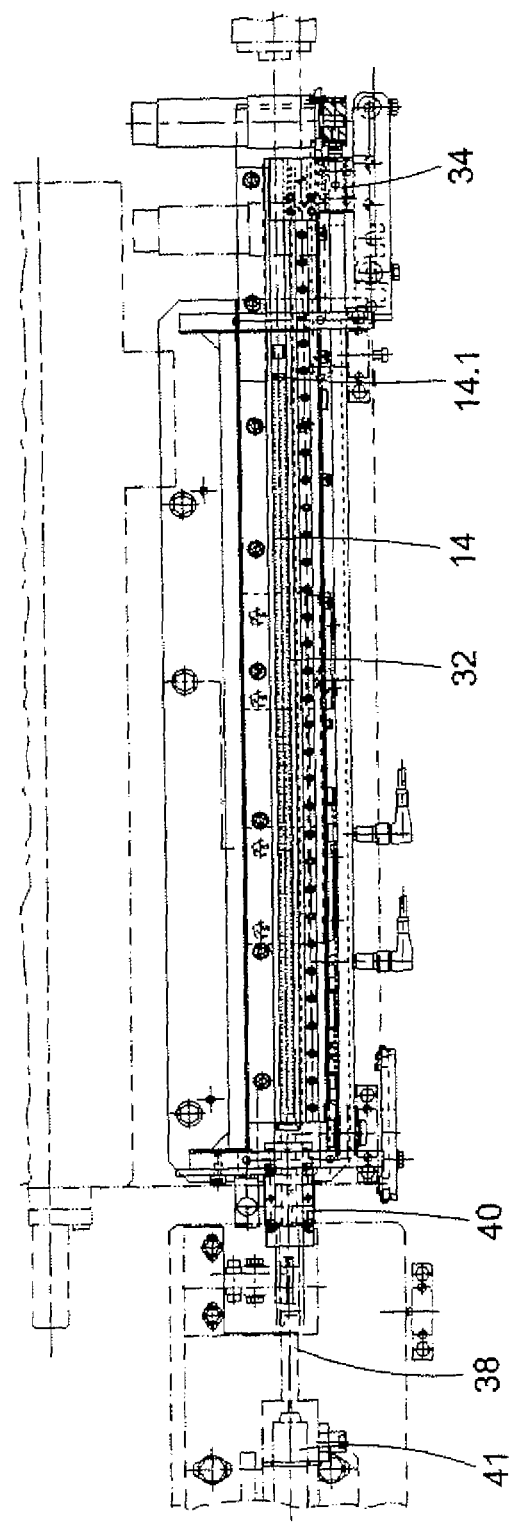
FIGS. 2A to 2E are top views of FIG. 1 in different steps of operation.
Figure 2B:
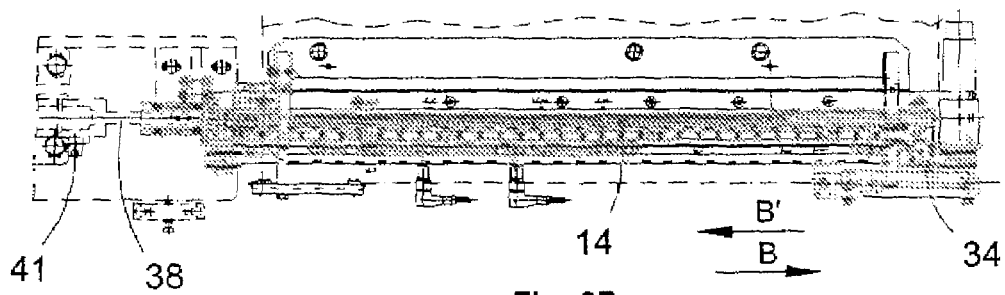

In FIG. 2B, the guide element 40 advances in order to place the cladding tube in alignment with the slide 32 and the clamp closes, immobilising the cladding tube.

Figure 2C:
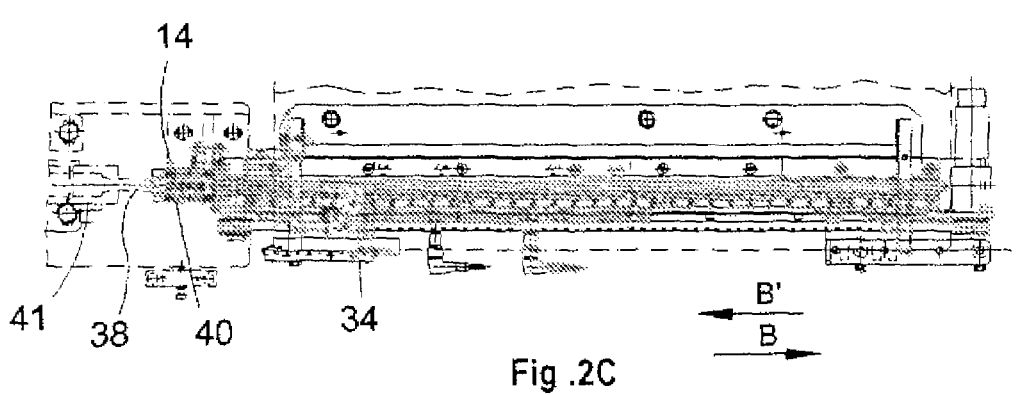

The belt 44 is then placed into movement in the sense of the arrow B' towards the front, the pusher 34 then exerts a push force on the spring 14, which is introduced into the cladding tube (FIG. 2C).

Figure 2D:
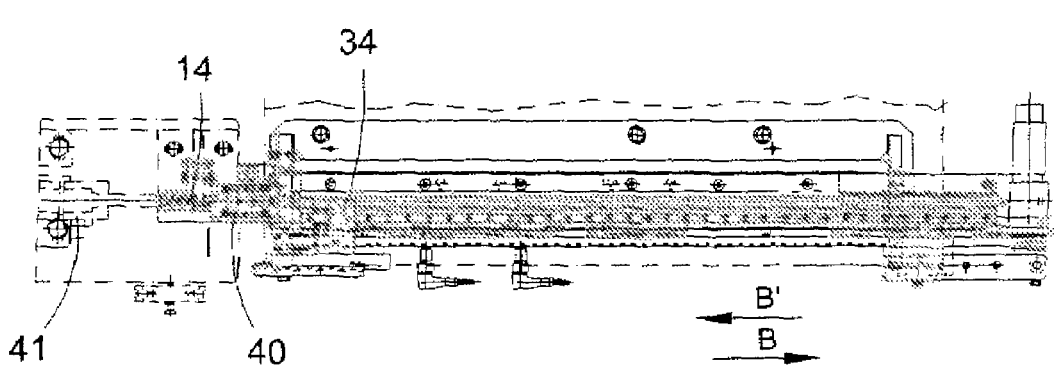

Then, by a combined movement, the guide element moves in the direction B, while the pusher 34 moves according to the direction B' in order to maintain the spring 14 in the cladding tube (FIG. 2D).

Figure 2E:
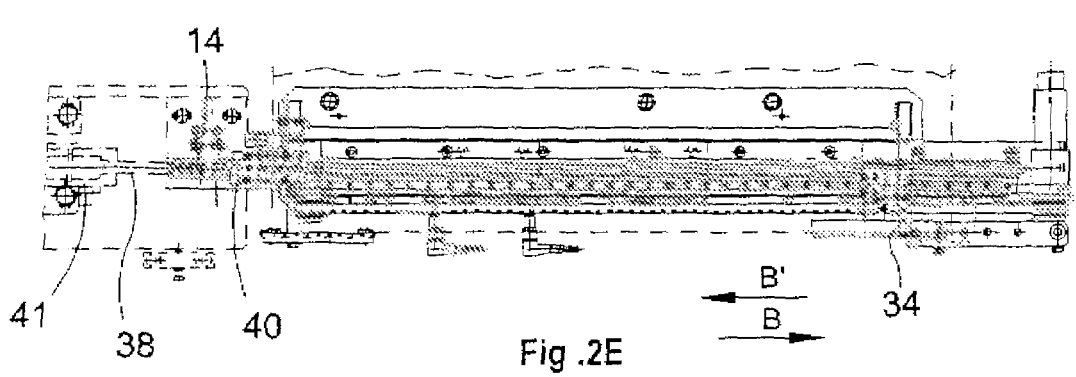
Figure 3:
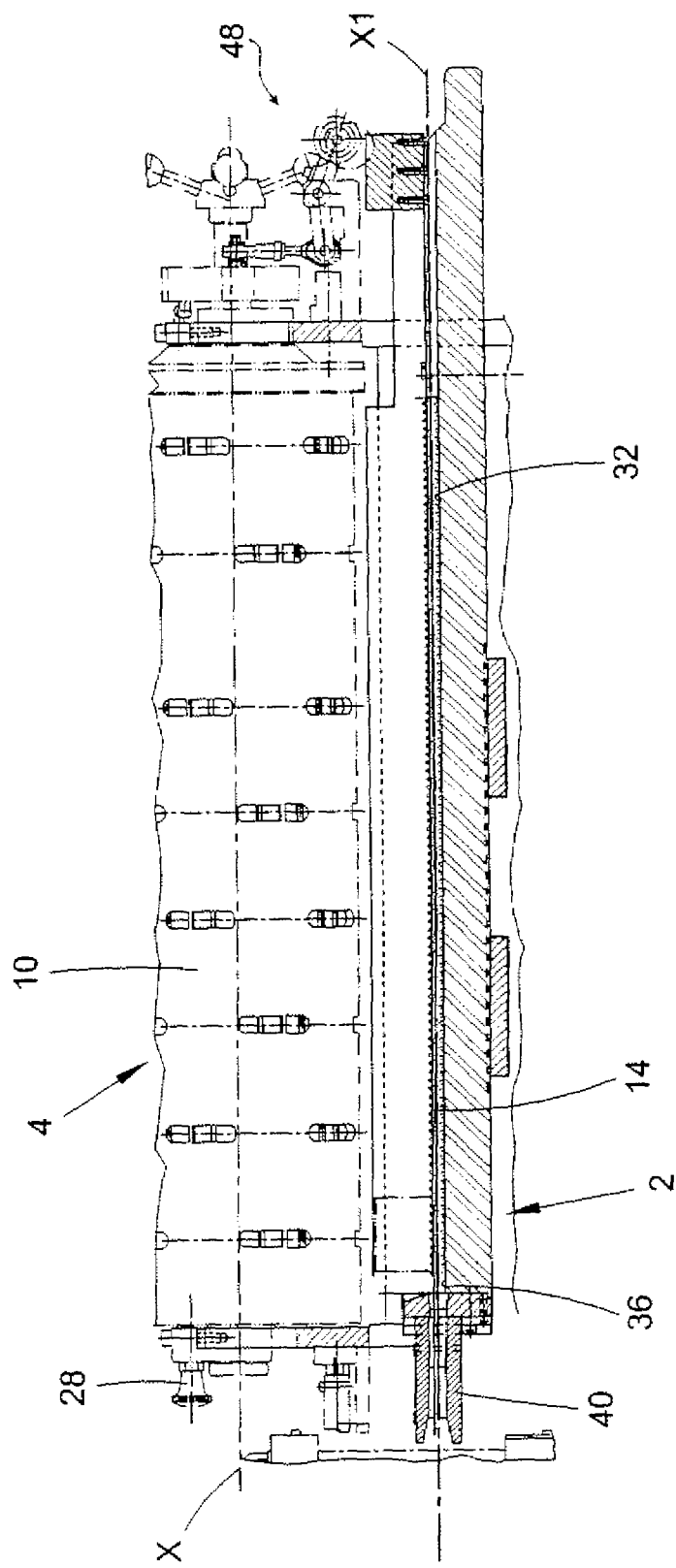
FIG. 3 is a longitudinal cross-section view of FIG. 1.

Finally, the guide element and the pusher 34 move in the direction B, until they reach their at-rest position (FIG. 2E).

The cladding tube is ready to receive the pellets or to be sealed if the pellets have been set into place before the spring, and the spring mounting device is ready to load a new cladding tube.

In a first step, the filling of the distributor can be provided. For this, the pin is unscrewed, the jacket 10 is turned around the X axis so as to place the slot 16 in the position I shown in FIG. 7A, the slot 16 is in an upper position, the pin is then tightened to fix this position I.

In this position I, the slot 16 is across from a spring loading chute (not shown). A spring 14 is then set into place in a groove 12, then the cylinder barrel 8 is turned around its axis, in order to present the following empty groove 12 across from the slot 16 and to allow for its loading with a spring. A handle 68 is advantageously provided on the cylinder barrel 8 in order to have it turn around the X axis.

A groove 12 is left empty across from the slot 16.

It can be provided to fill all of the grooves 12 except one or a few of them.

When the number of desired grooves is loaded with a spring, the pin is again loosened, the jacket 10 is turned around the X axis in order to place the slot in the distribution position II shown in FIG. 7B. During this rotation, the cylinder barrel 8 turns at the same time as the jacket 10, the slot 16 then remains across from the empty groove 12. The pin is then tightened to fix the jacket in this position II.

The distributor 4 is then ready to provide springs 14 to the loader 2.

The invention claimed is:

1. Spring mounting device configured to mount a spring in a cladding tube for nuclear fuel, comprising:
    a spring distributor,
    a spring loader configured to be inserted into the cladding tube, the spring distributor configured to supply springs to the spring loader, said spring loader comprising:
    a longitudinal slide configured to receive the springs, said slide comprising:
    an outlet end whereby the spring is configured to be placed in the cladding tube,
    a pusher able to move in the slide and configured to set the spring into place in the cladding tube, and
    means of displacement of said pusher, and
    mechanical control that connects the spring loader to the spring distributor, causing the supply of the spring after the actuation of the spring loader,
    wherein the spring distributor comprises a cylinder barrel of longitudinal axis pivotable around its axis, said cylinder barrel comprising longitudinal grooves on its outer peripheral surface able to each receive one spring, a jacket surrounding the cylinder barrel, provided with a longitudinal slot able to allow a spring to pass, said cylinder barrel and said jacket being able to turn independently of each other around the longitudinal axis in order to align the slot with a groove, the jacket being able to be in a filling position of the cylinder barrel and to be in a distribution position of the cylinder barrel, said slot being arranged to face the slide of the spring loader in distribution position, the actuation of the means of displacement causing by the intermediary of the mechanical means the rotation of the cylinder barrel in relation to the jacket and the alignment of the slot with a groove loaded with a spring.

2. Device according to claim 1, wherein the mechanical means (48) comprise a non-return means having a ratchet wheel interposed between the cylinder barrel and the means of displacement.

3. Device according to claim 2, wherein the mechanical means comprise a link arm attached to a pawl of the ratchet wheel, a sprocket wheel of the ratchet wheel being integral in rotation with the cylinder barrel, a first end of a lever arm being connected to a second end of the link arm by a pivot connection, the lever arm being mounted pivotable on a second post around an axis of rotation, said second post supporting a second end of the cylinder barrel, a second end of the lever arm opposite the first end in relation to the axis of rotation being able to come into contact with a mobile element integral with the means of displacement in order to pivot the lever arm around the axis of rotation.

4. Device according to claim 3, wherein the mobile element comprises a ramp, along which the second end of the lever arm is able to slide.

5. Device according to claim 3, wherein the lever arm comprises a roller mounted on the second end of the lever arm, said roller being pivotable around an axis parallel to the axis of rotation.

6. Device according to claim 1, wherein the spring distributor comprises means for locking the jacket either in the filling position, or in the distribution position.

7. Device according to claim 6, wherein the means of locking comprise a threaded element screwed in a first post supporting the first longitudinal ends of the cylinder barrel and the first longitudinal end of the jacket, said means of locking cooperating with the jacket in the filling position and in the distribution position.

8. Device according to claim 1, wherein the means of displacement comprise a belt extending longitudinally under the slide, the pusher being integral in movement with said belt.

9. Device as according to claim 1, wherein the spring loader comprises a guide configured to guide an open end of the cladding tube in order to align said end with the outlet end of the slide.

10. Device according to claim 9, wherein the spring loader comprises means to cause the guide and the pusher to move closer together after the spring is mounted in the slide, said pusher moving in the direction of the outlet end of the slide.

* * * * *

UNITED STATES PATENT AND TRADEMARK OFFICE
CERTIFICATE OF CORRECTION

PATENT NO. : 8,644,445 B2  
APPLICATION NO. : 12/278132  
DATED : February 4, 2014  
INVENTOR(S) : Vasseur et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1556 days.

Signed and Sealed this

Twenty-ninth Day of September, 2015

Michelle K. Lee  
*Director of the United States Patent and Trademark Office*